Sept. 11, 1956
T. L. FAWICK
2,762,396
DIAPHRAGM AND PISTON ASSEMBLY
Filed Aug. 23, 1952
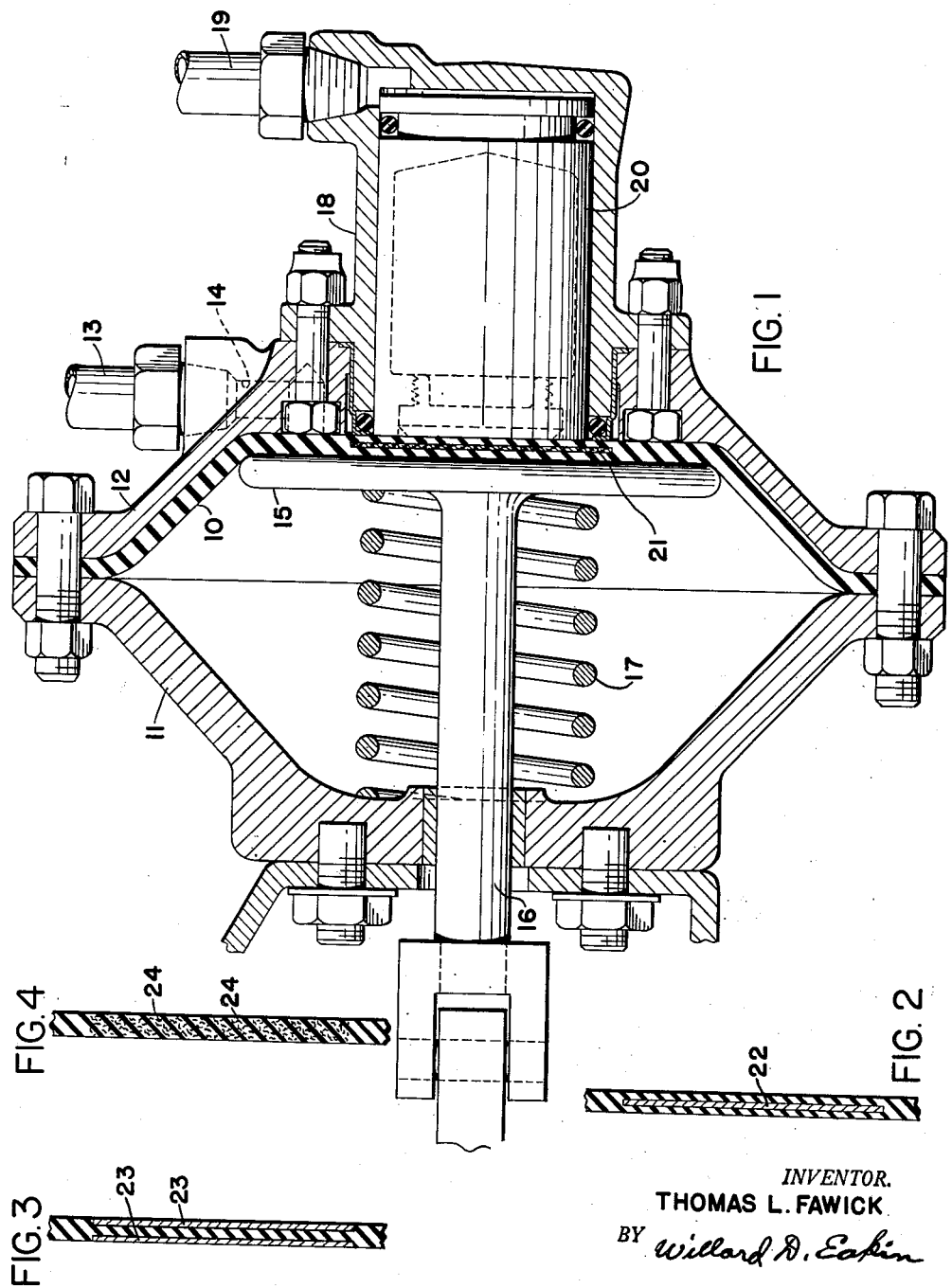
INVENTOR.
THOMAS L. FAWICK
BY Willard D. Eakin
ATTORNEY United States Patent Office 2,762,396
Patented Sept. 11, 1956

2,762,396

DIAPHRAGM AND PISTON ASSEMBLY

Thomas L. Fawick, Cleveland, Ohio

Application August 23, 1952, Serial No. 306,018

1 Claim. (Cl. 137—792)

This invention relates to an assembly in which a fluid-impelled diaphragm acts against a head formed on a push-rod for actuating a brake or the like, as in my copending application Ser. No. 209,788, filed February 7, 1951, patented December 13, 1955, Patent No. 2,726,738, and is driven by an independently actuated piston in case of failure of the pressure-fluid supply for direct actuation of the diaphragm, or, on other occasions, for augmenting the force of the diaphragm by the force of the piston.

Its chief object is to avoid early damage of the diaphragm by local compression of it between the piston, or a piston driven member, and the push-rod head against which the diaphragm normally applies its force as a directly fluid-impelled diaphragm.

Of the accompanying drawings:

Fig. 1 is an axial section of an assembly embodying my invention in its preferred form.

Figs. 2, 3 and 4 are fragmentary sections of respective diaphragms having alternative types of reinforcements.

The diaphragm, 10, is composed primarily of vulcanized natural or synthetic rubber or a material having substantially the resilient deformability of vulcanized soft-rubber, all of which are included in the word rubber as herein used.

It is clamped at its outer margin between dished members 11 and 12 which define the diaphragm chamber, adapted to be supplied with pressure fluid through a supply-and-exhaust pipe 13 coupled to a passage 14 which leads to and opens upon the inner face of the member 12.

For ordinary operation the central portion of the diaphragm fits against a flat face of, and impels, a head 15 formed on a push-rod 16 which slidably extends axially through the chamber-wall member 11. A compression return spring 17 surrounds the push-rod and bears at its ends against the members 11 and 15 for returning the diaphragm when the supply-pipe 13 is exhausted, by suitable valve means not shown.

Mounted in a central opening in the chamber-wall member 12 is a pressure-fluid cylinder 18 having a supply-and-exhaust pipe 19 and having within it a piston 20.

In the present embodiment the cylinder 18 is an open-end cylinder and the piston itself is adapted to project from the open end of the cylinder and bear directly against the central part of the diaphragm.

For reasons of compactness and convenience the piston 20 is of substantially smaller diameter than the head 15 of the push-rod and, because of its relatively small diameter, is actuated by a fluid, preferably a liquid, at high pressure.

When the diaphragm is an all-rubber diaphragm, the smallness of its area contacted by the piston, and/or the high pressure of the fluid actuating the piston, results, or result, in a high per-square-inch compressive force against the part of the diaphragm contacted by the piston. In an all-rubber diaphragm this produces a substantial flow of the rubber from between the two embracing members and at the periphery of the piston face, especially, a destructive over-stressing of the rubber occurs, as is manifested by a local bulging of the rubber in a zone surrounding the pressing face of the piston.

Even without sliding of the rubber on either of the two embracing faces, the flow of the rubber midway of the thickness of the all-rubber diaphragm may be excessive. The shear strains produced in the rubber are cumulatively greater outward, toward the periphery of the piston.

I avoid this outwardly cumulative distortion of the rubber by building into the central portion of the diaphragm a core member 21, here shown as being of fabric, preferably a little larger in diameter than the piston, and preferably by bonding the rubber to the core throughout its extent, in the vulcanizing of the diaphragm.

The core 21, not necessarily as thin as it is shown in the drawing, provides the desired result in at least two ways. One is that, being bonded to the rubber, it prevents, by its tensile strength, the cumulative flow of the rubber. Even when it is as thin as it is here shown, it separates a relatively wide or thick flow space into two much narrower or thinner flow spaces, so that the rubber in each narrow flow space will withstand high pressure of the piston without substantial or excessive flow.

The other way in which the core provides the desired result is that, whether made of fabric or of more rigid material, and whether or not occupying the full thickness, or substantially the full thickness, of the diaphragm, it causes the diaphragm to be less-compressible in the direction of its thickness, so that its simple resistance to compression, independently of its being bonded to the rubber, sustains harmlessly a high pressure of the piston.

When the piston 20 is not being actuated, pressure fluid between it and the diaphragm holds it at the limit of its rightward movement in the cylinder while the diaphragm moves the head to the left, and when the pipe 13 is exhausted the return spring 17 holds the piston seated in its cylinder except when the spring is overcome by the actuating force of the piston.

In Fig. 2 the diaphragm has embedded in it, midway of its thickness, a metal plate 22.

In Fig. 3 the diaphragm has embedded in and adhered to its opposite faces respective metal face plates 23, 23.

In Fig. 4 the central portion of the diaphragm is reinforced with comminuted material such as ground fiber particles 24, 24.

Other modifications are possible without departure from the scope of the invention as defined in the appended claim.

I claim:

An assembly comprising a diaphragm formed primarily of rubber, fluid confining means therewith defining an expansion chamber on one side of said diaphragm, a diaphragm-impelled member on the other side of said diaphragm and formed with a plane face contacted by a central part of the diaphragm, but not secured thereto, for impelling of said member by the diaphragm, means for conducting a pressure fluid into said expansion chamber for impelling said diaphragm and said member, and a presser member extending through a wall of said fluid-confining means and slidably sealed thereto and having a plane face contacting a central part of the face of the diaphragm within the expansion chamber, the said plane faces of the diaphragm-impelled member and the presser member being parallel to each other and embracing between them an extensive part of the diaphragm inclusive of its center, the said diaphragm comprising a flowresisting reinforcement in the central part thereof embraced between the two defined plane faces and a more highly flexible and stretchable annular zone surrounding its reinforced central part.

References Cited in the file of this patent

UNITED STATES PATENTS

| | | |
|---|---|---|
| 643,519 | Miller | Feb. 13, 1900 |
| 1,045,053 | Merritt | Nov. 19, 1912 |
| 1,516,630 | Coberly | Nov. 25, 1924 |
| 1,910,322 | Coffin et al. | May 23, 1933 |
| 2,061,905 | Hewitt | Nov. 24, 1936 |
| 2,324,880 | Rogers et al. | July 20, 1943 |
| 2,409,759 | Hosking | Oct. 22, 1946 |
| 2,428,771 | Almy | Oct. 14, 1947 |
| 2,478,575 | Fitch | Aug. 9, 1949 |
| 2,517,056 | Trubert | Aug. 1, 1950 |
| 2,584,959 | Yocom et al. | Feb. 5, 1952 |

FOREIGN PATENTS

| | | |
|---|---|---|
| 7,605 | Norway | Oct. 2, 1899 |
| 510,035 | Great Britain | July 26, 1939 |